(12) United States Patent
Fedosov et al.

(10) Patent No.: US 10,217,288 B2
(45) Date of Patent: Feb. 26, 2019

(54) METHOD FOR REPRESENTING POINTS OF INTEREST IN A VIEW OF A REAL ENVIRONMENT ON A MOBILE DEVICE AND MOBILE DEVICE THEREFOR

(71) Applicant: Apple Inc., Cupertino, CA (US)

(72) Inventors: Anton Fedosov, Munich (DE); Stefan Misslinger, San Jose, CA (US); Peter Meier, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/480,142

(22) Filed: Apr. 5, 2017

(65) Prior Publication Data

US 2017/0213393 A1  Jul. 27, 2017

Related U.S. Application Data

(63) Continuation of application No. 15/024,800, filed as application No. PCT/EP2013/069844 on Sep. 24, 2013, now Pat. No. 9,646,422.

(51) Int. Cl.
  *G06F 3/01*    (2006.01)
  *G01C 21/36*   (2006.01)
  (Continued)

(52) U.S. Cl.
  CPC ........ *G06T 19/006* (2013.01); *G01C 21/3611* (2013.01); *G01C 21/3638* (2013.01);
  (Continued)

(58) Field of Classification Search
  None
  See application file for complete search history.

(56) References Cited

U.S. PATENT DOCUMENTS 6,653,990 B1 * 11/2003 Lestruhaut ............. G06T 15/10
                                                     345/8
9,767,613 B1 *  9/2017 Bedikian ............. G06T 19/006
                    (Continued)

FOREIGN PATENT DOCUMENTS

CN    102629183 A    8/2012
CN    102695034 A    9/2012
              (Continued)

OTHER PUBLICATIONS

Malens: "Layar, worlds first mobile Augmented Reality Browser," Jun. 15, 2009 (Jun. 15, 2009), p. 1, XP054975260, Retrieved from the Internet: URL:https://www.youtube.com/watch?v=b64_16Ke08.

(Continued)

*Primary Examiner* — Lana N Le
(74) *Attorney, Agent, or Firm* — Blank Rome LLP

(57) ABSTRACT

There is disclosed a method and mobile device for displaying points of interest in a view of a real environment displayed on a screen of the mobile device with a functionality for interaction with a user, which comprises the steps of: capturing an image of the real environment or a part of the real environment using a camera, determining at least one point of interest related to the real environment, determining an image position of the at least one point of interest in the image, displaying at least part of the image on at least part of the screen, overlaying a computer-generated indicator with the at least part of the image on the screen at a screen position according to the image position of the at least one point of interest, displaying a computer-generated virtual object related to the at least one point of interest on the screen at a screen position determined according to the screen position of the computer-generated indicator and which is adjacent to a bottom edge of the screen, displaying a visually perceivable relation indication indicative of a (Continued)

relation between the computer-generated virtual object and the computer-generated indicator. The mobile device may perform an action related to the at least one point of interest if at least part of the computer-generated virtual object displayed on the screen is touched.

17 Claims, 13 Drawing Sheets

(51) Int. Cl.
G06T 19/00 (2011.01)
H04L 29/06 (2006.01)
G06T 15/20 (2011.01)

(52) U.S. Cl.
CPC .......... *G01C 21/3679* (2013.01); *G06F 3/011* (2013.01); *G06T 15/20* (2013.01); *H04L 29/06034* (2013.01)

(56) References Cited

U.S. PATENT DOCUMENTS

| | | |
|---|---|---|
| 2002/0175901 A1 | 11/2002 | Gettemy |
| 2005/0008256 A1 | 1/2005 | Uchiyama |
| 2006/0202953 A1 | 9/2006 | Pryor |
| 2008/0225109 A1 | 9/2008 | Lee |
| 2009/0298537 A1 | 12/2009 | Choi |
| 2011/0275415 A1 | 11/2011 | Lee |
| 2012/0176410 A1* | 7/2012 | Meier ............... G06F 3/011 345/633 |
| 2012/0242807 A1 | 9/2012 | Umezu |
| 2015/0023602 A1* | 1/2015 | Wnuk ............... G06F 17/30247 382/190 |
| 2015/0222741 A1 | 8/2015 | Kim |
| 2015/0289104 A1 | 10/2015 | Jung |
| 2016/0196692 A1* | 7/2016 | Kjallstrom ............ G06T 19/006 345/633 |
| 2016/0239080 A1* | 8/2016 | Marcolina ............... G06F 3/011 |
| 2016/0307374 A1* | 10/2016 | Kurz ................... G06T 19/006 |
| 2017/0337744 A1* | 11/2017 | Martin ................ G01S 19/14 455/566 |
| 2018/0075649 A1* | 3/2018 | Godwin ................ G06T 17/05 455/566 |
| 2018/0095636 A1* | 4/2018 | Valdivia ............ G06F 3/04815 |
| 2018/0107269 A1* | 4/2018 | Benzies ............... G06T 15/506 |
| 2018/0249343 A1* | 8/2018 | Priest ................ H04W 16/18 455/457 |

FOREIGN PATENT DOCUMENTS

| | | |
|---|---|---|
| CN | 103034416 A | 4/2013 |
| CN | 103092344 A | 5/2013 |
| CN | 103139354 A | 6/2013 |
| CN | 103246431 A | 8/2013 |
| KR | 101285360 B1 | 7/2013 |

OTHER PUBLICATIONS

Niftybrick Software: "Heads Up Navigator: 3D Augmented Reality Navigation on the App Store on iTunes," Nov. 20, 2009 (Nov. 20, 2009), XP055091229, Retrieved from the Internet: URL:https://itunes.apple.com/gb/app/heads-up-navigator-3d-augmented/id330367042 [retrieved on Dec. 3, 2013].

* cited by examiner

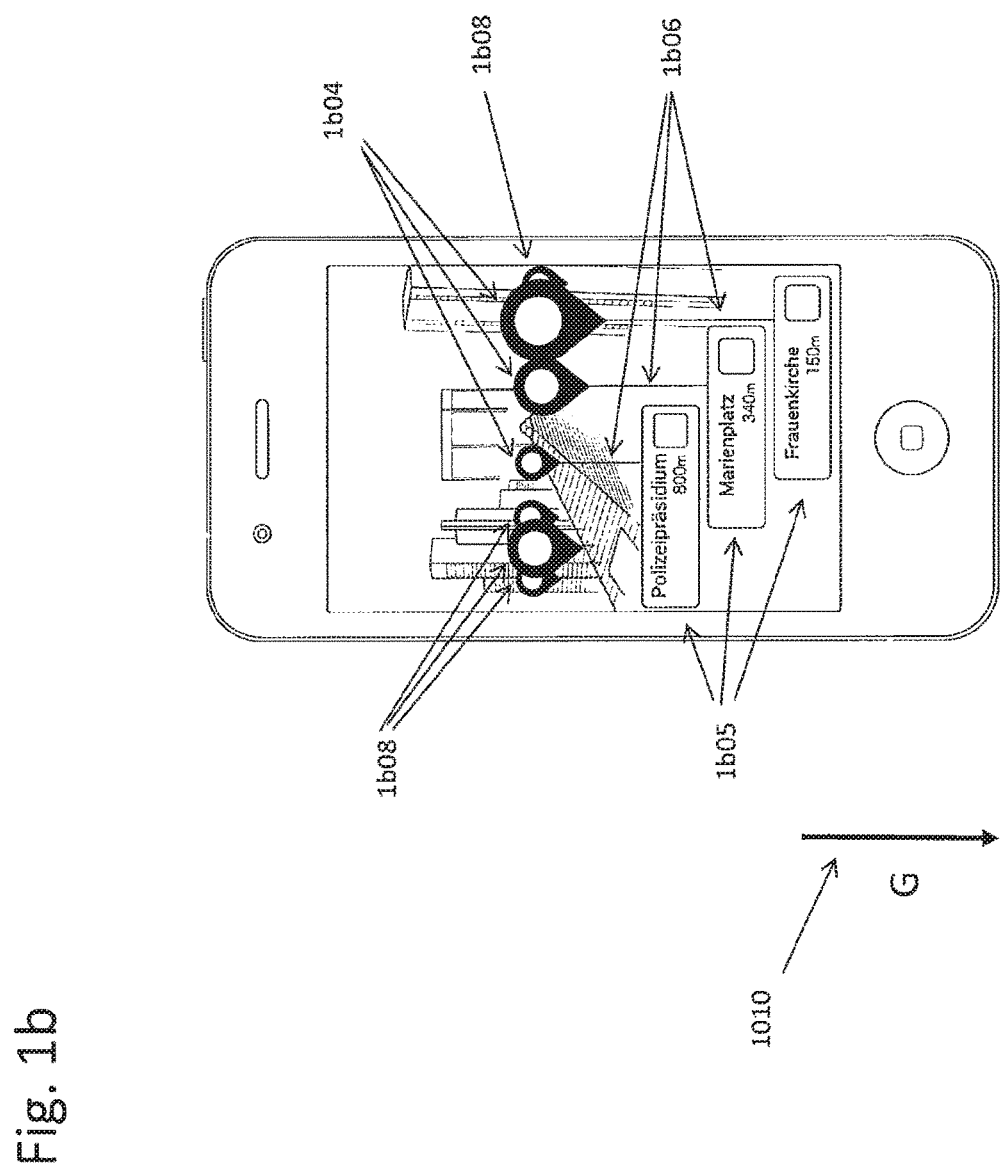

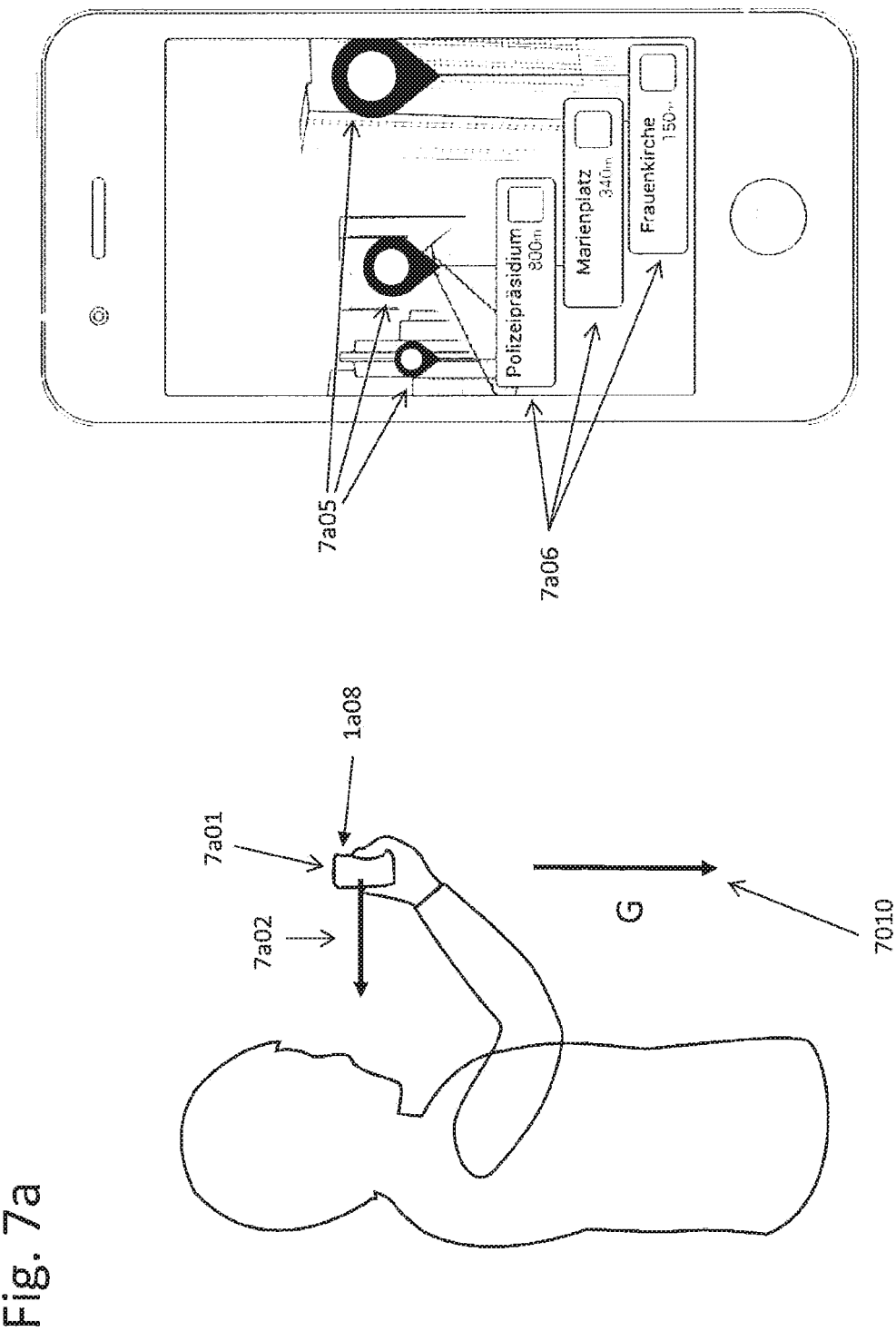

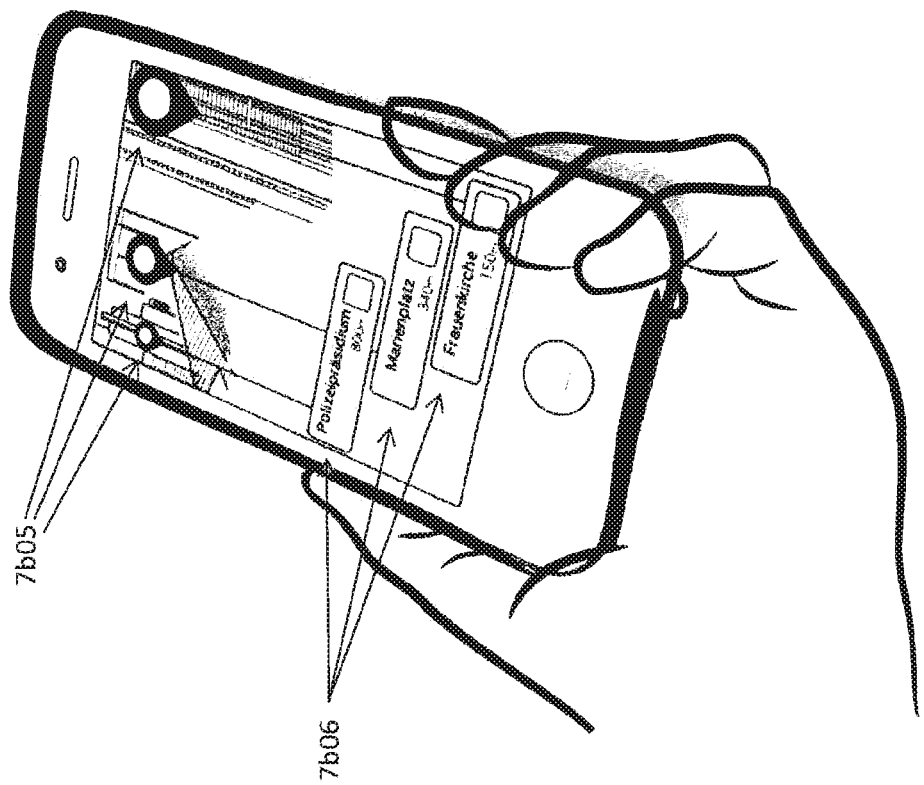
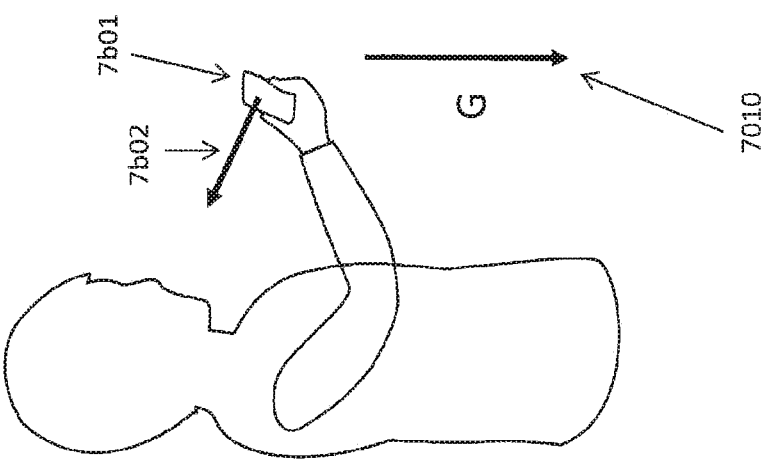
Fig. 7b

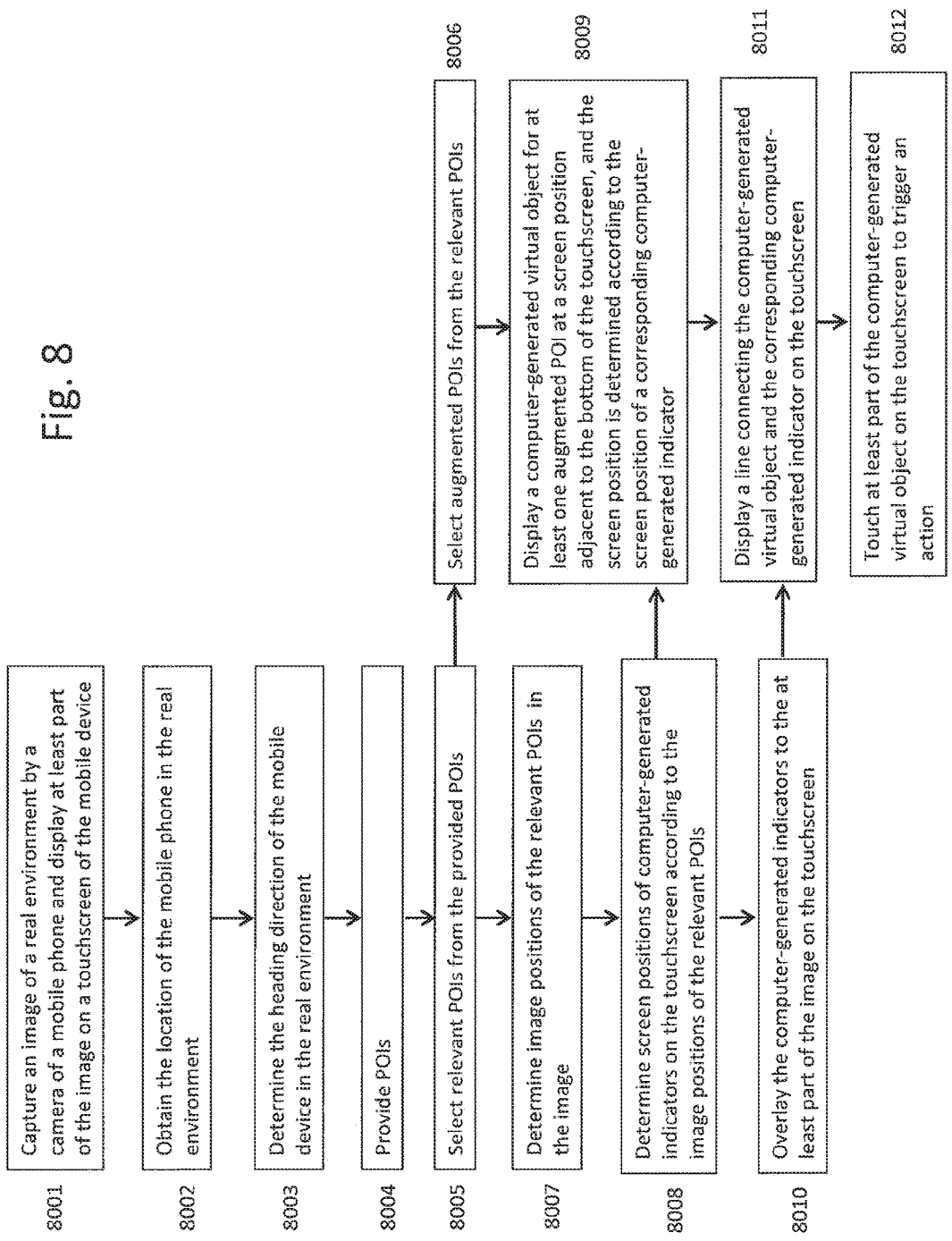

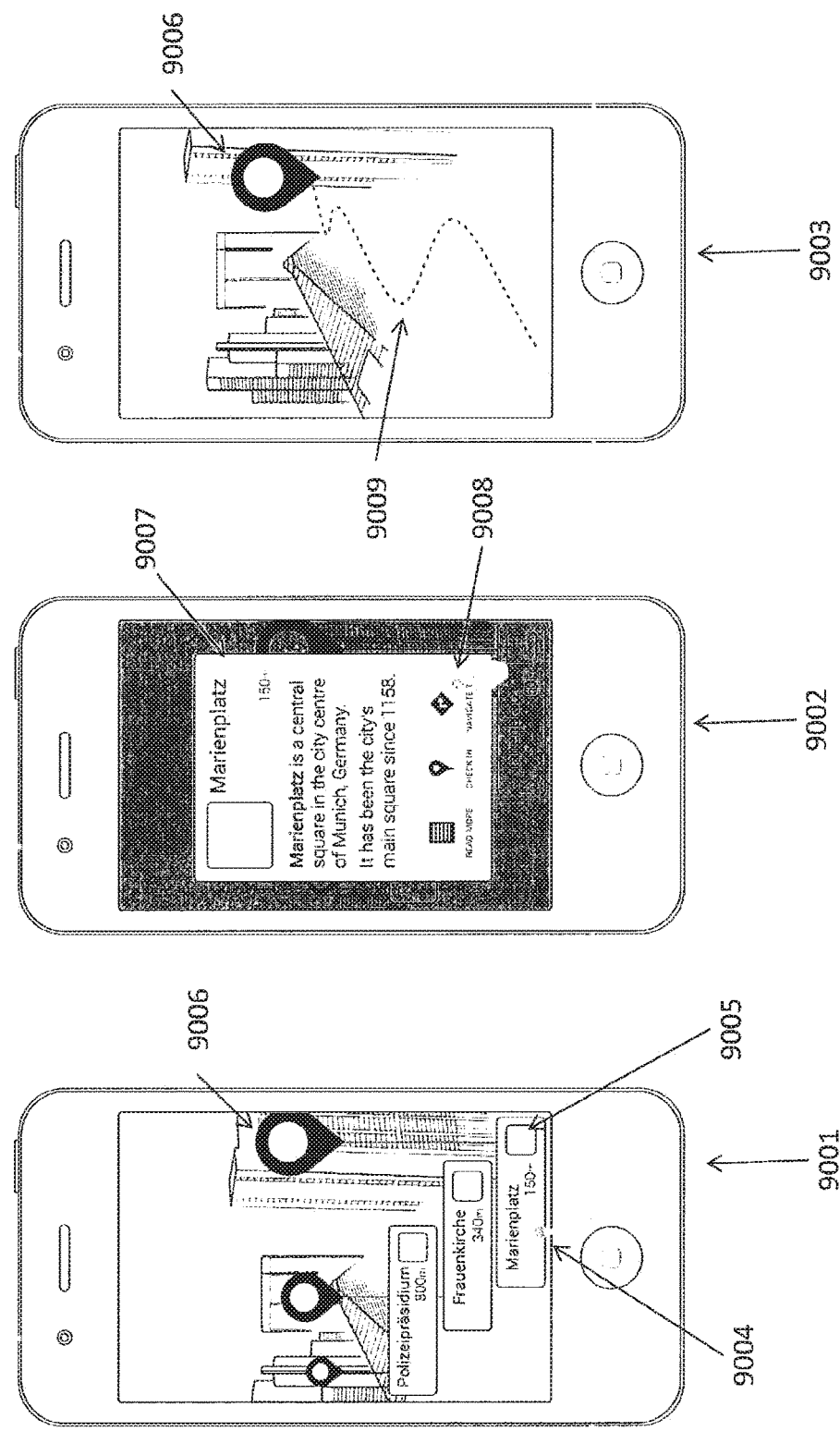

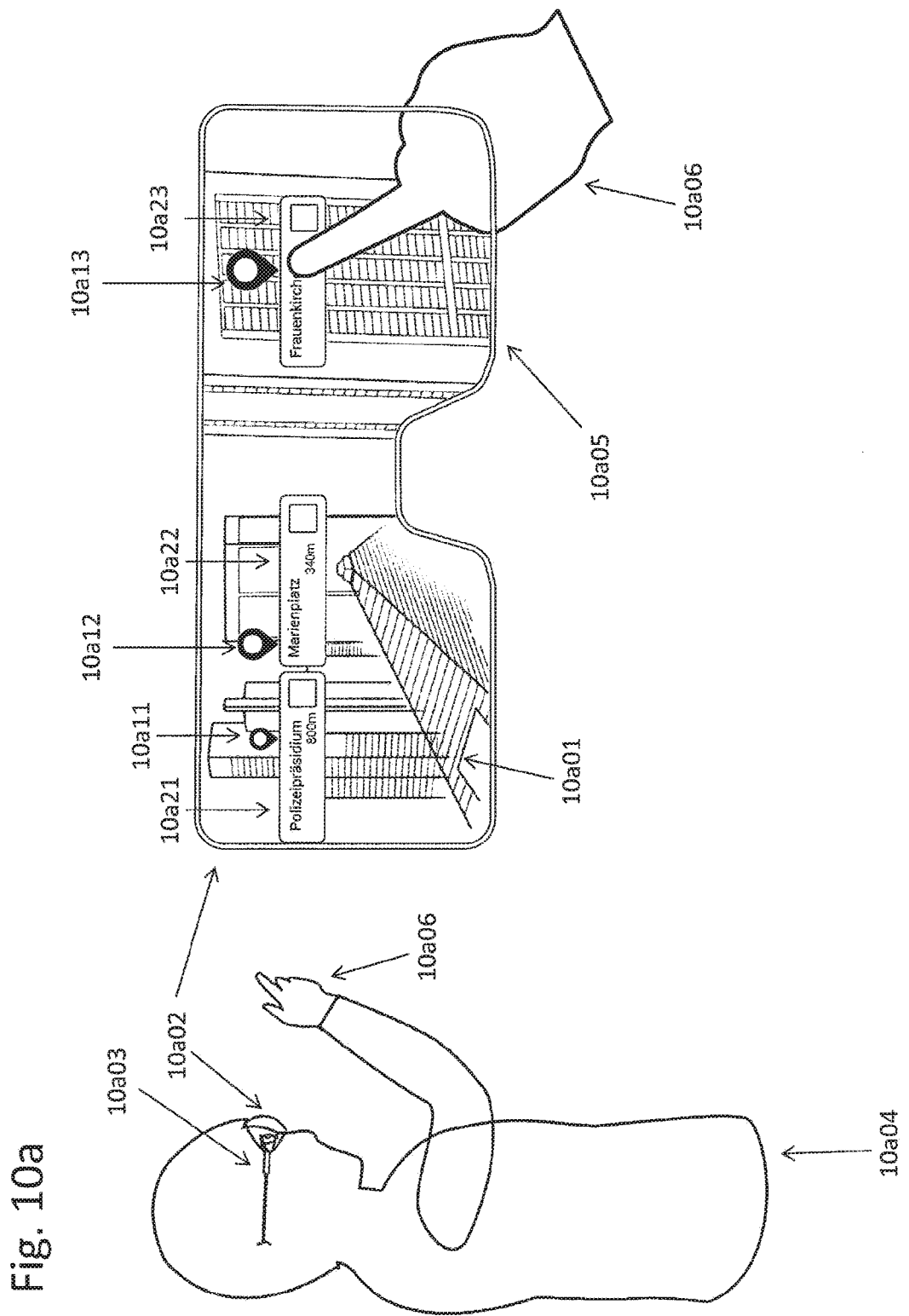

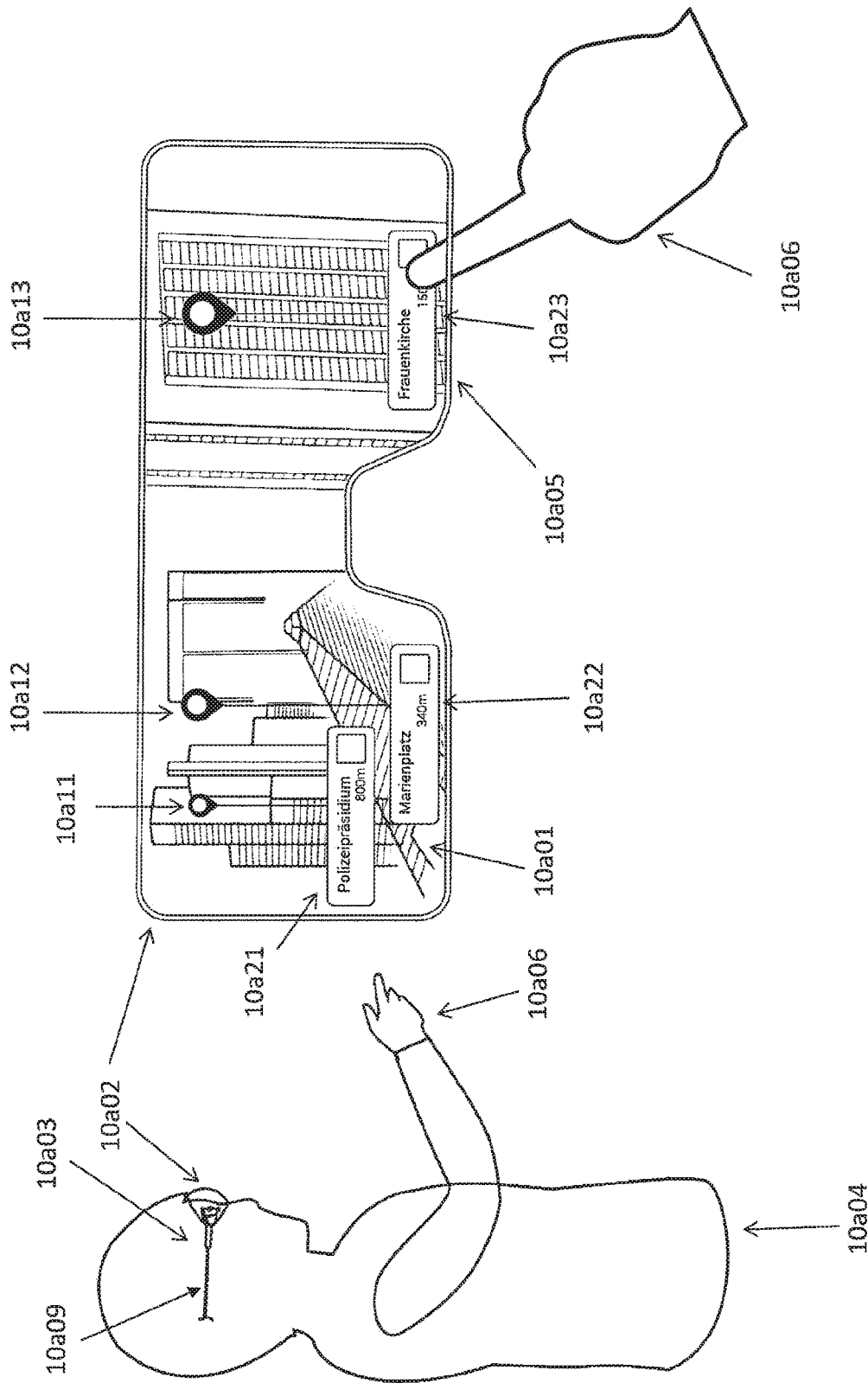

METHOD FOR REPRESENTING POINTS OF INTEREST IN A VIEW OF A REAL ENVIRONMENT ON A MOBILE DEVICE AND MOBILE DEVICE THEREFOR

BACKGROUND

The present disclosure is related to a method for representing points of interest in a view of a real environment on a screen of a mobile device with a functionality for interaction with a user. The present disclosure is further related to a mobile device and a computer program product comprising software code sections which are adapted to perform such method.

SUMMARY

It is known that Augmented Reality (AR) systems could enhance information of a real environment by providing a visualization of overlaying computer-generated virtual information with a view of the real environment or a part of the real environment. The virtual information can be any type of visually perceivable data such as objects, texts, drawings, videos, or their combination. The view of the real environment or a part of the real environment could be perceived as visual impressions by user's eyes and/or be acquired as one or more images captured by a camera held by a user or attached on a device held by a user.

A point of interest (commonly referred to as "POI") is known in the art to represent a location or a real object (e.g., a building, a landmark, a moving car) in a real environment. A POI often has associated digital content that is related to the location or the real object. The digital content could be, for instance, audio information, video information, pictures, textual information, 3D representations or their combinations.

Representing points of interest (POIs) in a view of a real environment is particularly useful and popular in location-based (mobile) augmented reality applications, such as tour guidance for exploring the urban environment. For example, users may use augmented reality to see visual information related to POIs overlaid with the view of the real environment when they are in unknown places or want to obtain information about things they see.

Augmented reality systems face significant challenges to more usefully display POIs to users. It is especially challenging to overlay the POIs with an image of a real environment on a screen of a mobile device, e.g. a hand-held device or a wear-able device, as the screen commonly has a very limited size and the POIs may occlude part of imagery information on the screen. Further, enabling the users to intuitively interact with the POIs displayed on the screen is another challenge, particularly if the device has limited input capabilities.

A touchscreen, such as of a mobile device, could provide a direct interface between the users and the POIs displayed on the touchscreen. For example, the user could touch a POI on the screen in order to show more information related to the POI on the screen. However, there exist easily and difficult accessible areas on a touchscreen of a hand-held device, e.g. mobile phone, or tablet. It is typically inconvenient for a user's finger to reach the difficult accessible areas, while the user holds the device. While the user touches the POIs on the screen, the fingers might also occlude some imagery information on the touchscreen. Thus, representing POIs on a touchscreen of a hand-held device is desirable to be optimized for comfortable user interaction and information visibility.

Yovcheva et al. show one AR application of representing a POI in an image of a real world on a screen of a mobile device. A computer-generated icon is overlaid at the image position of the POI on the screen. The icon is connected by a line to a sidebar of the screen where an annotation shows additional information about the POI.

Grasset et al. investigated an optimal placement of virtual objects in an image of a real world and they propose a method to overlay a computer-generated annotation of a POI in an image position, such that important imagery information in the image is not occluded.

Rose et al. present a system and method to annotate a real object or parts of the real object in an image captured by a camera. They first compute a camera pose of the image relative to the real object, e.g. based on a 3D model of the real object, and then overlay computer-generated texts with a computer-generated line drawn to the annotated part of the real object in the image.

Uusitalo et al. disclose a method for displaying POI information based on partitioning of the real environment. The method determines to overlay one or more POIs based on the one or more partitions of the view of the real environment. They teach utilizing the knowledge of floor plan or height of a building to separate the building into partitions and overlaying the POI information to corresponding partitions in an image of the buildings.

When POIs have the same view direction, the POIs may be arranged behind each other for displaying in augmented reality applications. In this regard, some of the POIs may not be visible, as they may be hidden behind other POIs. For this, Sandberg motivates grouping POIs that have the same view direction and then displaying the grouped POIs in a visible manner.

Meier et al. disclose a method to achieve an ergonomic representation of POIs in augmented reality systems by subdividing the view of the real environment into a plurality of regions based on the distances of the regions to the view point.

For representing POIs in an image of a real environment displayed on a screen of a mobile device, none of these prior arts proposes any solution for the problem of an inconvenient user interaction with POIs displayed on a screen caused by difficult accessible areas and the problem of imagery information occluded by user's fingers during user interactions, e.g. when touching a POI on the screen.

It is an object of the invention to provide a method for representing points of interest in a view of a real environment displayed on a screen of a mobile device with a functionality for interaction with a user, which is capable to provide an improved way of comfortable user interaction and information visibility.

According to a first aspect, there is provided a method for representing points of interest in a view of a real environment displayed on a screen of a mobile device with a functionality for interaction with a user, which comprises the steps of: capturing an image of the real environment or a part of the real environment using a camera, determining at least one point of interest related to the real environment, determining an image position of the at least one point of interest in the image, displaying at least part of the image on at least part of the screen, overlaying a computer-generated indicator with the at least part of the image on the screen at a screen position according to the image position of the at least one point of interest, displaying a computer-generated virtual object related to the at least one point of interest on the screen at a screen position determined according to the screen position of the computer-generated indicator and which is adjacent to a bottom edge of the screen, and displaying a visually perceivable relation indication indicative of a relation between the computer-generated virtual object and the computer-generated indicator. Preferably, the mobile device may perform an action related to the at least one point of interest if at least part of the computer-generated virtual object displayed on the screen is touched.

According to the first aspect, there is also provided a mobile device comprising a camera adapted for capturing an image of a real environment or a part of a real environment, a screen adapted for displaying at least part of the image on at least part of the screen, and a processing device configured to display points of interest in the image of the real environment when displayed on the screen. The processing device is further configured to determine at least one point of interest related to the real environment, to determine an image position of the at least one point of interest in the image, to overlay a computer-generated indicator with the at least part of the image on the screen at a screen position according to the image position of the at least one point of interest, to display a computer-generated virtual object related to the at least one point of interest on the screen at a screen position determined according to the screen position of the computer-generated indicator and which is adjacent to a bottom edge of the screen, and to display a visually perceivable relation indication indicative of a relation between the computer-generated virtual object and the computer-generated indicator. Preferably, the processing device may further be configured to perform an action related to the at least one point of interest, such as performing a function or service of an application running on the mobile device related to the at least one point of interest, if at least part of the computer-generated virtual object displayed on the screen is touched, e.g. by a user's finger or device held by the user.

According to an embodiment, the screen may be a touchscreen or a screen that has no touchable capability. According to an embodiment, the screen is a touchscreen and the screen is touched by a user's finger or a device held by the user.

According to another embodiment, the at least part of the computer-generated virtual object displayed on the screen is determined to be touched by detecting an image position of a user's finger or a device held by the user in the image.

Particularly, the camera of the mobile device can be used to detect a user's finger or a device held by the user. Accordingly, an image position of the user's finger or device held by the user in the image of the real environment or the part of the real environment can be detected based on the image captured by the camera. A position of the computer-generated virtual object displayed on the screen relative to the image can be determined according to a screen position of at least part of the image displayed on the screen.

The mobile device could be triggered to perform an action related to the at least one point of interest, such as performing a function or service of an application running on the mobile device related to the at least one point of interest, according to the image position of the user's finger or device held by the user and the position of the computer-generated virtual object relative to the image. For example, if at least part of the computer-generated virtual object displayed on the screen overlaps with the user's finger, the mobile device is triggered to perform the action. The at least part of the computer-generated virtual object overlapping with the user's finger could be equivalent to that the at least part of the computer-generated virtual object displayed on the screen is touched by the user's finger.

This embodiment is particularly useful when using a head-mounted display comprising the camera and the screen. For example, the head-mounted display is a video-see-through head-mounted display (HMD). It is typically not possible for the user to touch the head-mounted screen in a manner like a touchscreen. However, the camera that captures an image of the real environment may also be used to detect image positions of the user's finger in the image. The image positions of the user's finger could be equivalent to touching points touched by the user's finger on the touchscreen.

According to a second aspect, there is provided a method for representing points of interest in a view of a real environment on a semi-transparent screen of a mobile device with a functionality for interaction with a user, comprising the steps of: determining at least one point of interest related to the real environment, determining a position of the at least one point of interest relative to the view, blending in a computer-generated indicator in at least part of the view on the semi-transparent screen at a screen position according to the position of the at least one point of interest relative to the view, blending in a computer-generated virtual object related to the at least one point of interest on the semi-transparent screen at a screen position determined according to the screen position of the computer-generated indicator and which is adjacent to a bottom edge of the semi-transparent screen, and blending in a visually perceivable relation indication indicative of a relation between the computer-generated virtual object and the computer-generated indicator. Preferably, the mobile device may perform an action related to the at least one point of interest if at least part of the computer-generated virtual object blended in on the semi-transparent screen is overlapped by a user's finger or device held by the user.

According to the second aspect, there is also provided a mobile device comprising a semi-transparent screen adapted for providing a view of a real environment and for representing points of interest in the view, and a processing device configured to display points of interest in the view of the real environment provided on the semi-transparent screen. The processing device is further configured to determine at least one point of interest related to the real environment, to determine a position of the at least one point of interest relative to the view, to blend in a computer-generated indicator in at least part of the view on the semi-transparent screen at a screen position according to the position of the at least one point of interest relative to the view, to blend in a computer-generated virtual object related to the at least one point of interest on the semi-transparent screen at a screen position determined according to the screen position of the computer-generated indicator and which is adjacent to a bottom edge of the semi-transparent screen, and to blend in a visually perceivable relation indication indicative of a relation between the computer-generated virtual object and the computer-generated indicator. Preferably, the processing device may further be configured to perform an action related to the at least one point of interest, such as performing a function or service of an application running on the mobile device related to the at least one point of interest, if at least part of the computer-generated virtual object blended in on the semi-transparent screen is overlapped by a user's finger or device held by the user.

For example, the semi-transparent screen is part of a head-mounted display, particularly part of an optical-see-through head-mounted display (HMD).

Aspects and embodiments of the invention described in the following with respect to the first aspect related to points of interest represented in a view of a real environment displayed on a screen, such as a touchscreen, of a mobile device can equivalently also be applied in combination with the second aspect with points of interest represented in a view of a real environment on a semi-transparent screen of a mobile device. Therefore, all the embodiments and aspects described herein can be combined and applied with the features of, both, the first aspect and the second aspect described above.

According to a further aspect, there is provided a computer program product comprising software code sections which are adapted to perform a method according to the invention as described herein when loaded into the internal memory of the mobile device. Particularly, the computer program product is non-transitory.

According to the invention, there is provided an improved way of comfortable user interaction and information visibility, wherein improved interaction and visualization design generally facilitates comparison, exploration and problem solving. The present invention considerably improves user experience in retrieving, visualizing and interacting with information about real objects (e.g. landmarks or buildings) that surround a user in a particular real environment. The present invention contributes to develop a solution with design principles feedback, visibility and affordance in mind:

The mobile device may be a hand-held device, such as a mobile phone or tablet computer. The mobile device may also be a wearable device, such as a watch or glass.

The camera may be any capturing device providing an image. It is not restricted to cameras providing color images in the RGB format. It can also be applied to any other color format and also to monochrome images, for example, to cameras providing images in grayscale format. The camera may further provide an image with depth data. The depth data does not need to be provided in the same resolution as the (color/grayscale) image. A camera providing an image with depth data is often called RGB-D camera. A RGB-D camera system may be a time of flight (TOF) camera system. Kolb et al. give an overview on state of the art of time-of-flight camera sensors and applications.

The screen of the mobile device may have a planar polygon shape (such as a screen as shown in the following Figures) and may be a touchscreen. The screen may be a LCD or LED screen.

It is not necessary to have a known spatial relationship between the optical axis and a normal direction of the screen. However, the spatial relationship between the optical axis and the normal direction of the screen may be provided or determined. For example, the optical axis of the camera has a fixed same or opposite direction as the normal direction of the screen. The camera may be rotatable or translatable with respect the screen. A spatial relationship between the camera and the screen could be measured by an encoded motor that connects the camera and/or the screen. It is also possible to attach positioning and/or orientation sensors to each of the camera and the screen for measuring their spatial relationship.

The at least one point of interest (POI) represents a location or a real object (e.g. a building, a landmark, a moving car) in a real environment and may include digital content that is related to the location or the real object. Any digital content related to the at least one point of interest may be provided, such as a name, description, image, video, or web address and their combinations. The real environment could be any real scene in real world, such as a nature scene, an indoor environment scene, or a city scene. A real environment includes one or more real objects and/or locations.

The at least one point of interest may have a known location in the real environment. For example, a building or a landmark commonly has a known location in a global coordinate system, such as a coordinate system having geo-location coordinates (e.g. the geo-location coordinates may comprise a 2D coordinate of longitude and latitude, or a 3D coordinate of longitude, latitude and altitude) and/or an address (e.g. floor number, street, postcode, country). The address and the global location may be converted to each other. Further, the at least one point of interest may have a known orientation in the real environment.

A pose as described herein describes an object's position and orientation relative to a coordinate system or an object.

A camera pose relative to the real environment may be determined using one or more location or orientation sensors. For example, a global positioning system (GPS) may be employed to determine the global location of the capture device (camera), e.g. a geo-coordinate such as a 2D coordinate of longitude and latitude, or a 3D coordinate of longitude, latitude and altitude. Various orientation sensors, such as compass and/or gravity sensors, can measure the orientation with respect to the global coordinate system. An indoor positioning system based on known locations of anchors, with systems making use of various optical, radio, and/or acoustic technologies, can also be used to determine the camera pose.

The camera pose of the image (i.e., the camera pose when capturing the image) relative to the at least one point of interest may be computed based on the position of the at least one POI and the camera relative to the real environment, e.g. a global coordinate system.

The camera pose of the image relative to the at least one point of interest can also be computed by using a computer vision method. For example, if a real object associated with the at least one point of interest is visible in the image and has a known geometrical size, then the camera pose relative to the at least one point of interest could be determined according to correspondences between 3D points on the real object and 2D image points of the real object in the image.

The image position of the at least one POI in the image may be computed based on the camera pose of the image relative to the at least one POI. For example, the image position is a projection of the at least one POI or a part of the at least one POI to the image plane of the camera.

The image position of the at least one POI may also be determined by analyzing image features in the image, e.g. according to image pixel values or template matching. For example, when at least part of a real object is visible in the image, an image area of the at least part of the real object may be determined by matching an image template of the real object with the image or a part of the image. Then, any one or multiple image points within the image area of the at least part of the real object may be chosen as the image position of the at least one point of interest.

An image captured by the camera may be completely displayed and occupy the whole screen. It is also possible to display only a part of the image. The displayed image or part of the image may also occupy a part of the screen instead of the whole screen.

The computer-generated indicator (e.g., a virtual balloon or a virtual circle as shown in the Figures) may be any computer generated visual information, such as an icon, a point, a letter or their combinations. The computer-generated indicator may be overlaid with the at least part of the image at or near to (within a predetermined distance) the image position of the at least one point of interest on the screen.

The computer-generated virtual object (e.g., rectangle boxes as shown in the Figures) may be any computer generated visual object, such as an icon, text, a figure, a video or their combinations. The computer-generated virtual object is related to the at least one point of interest. For example, the computer-generated virtual object may be an annotation, a name and/or a description of the at least one point of interest.

According to an embodiment, the computer-generated virtual object is displayed at a screen position which is lower than the displayed computer-generated indicator, particularly along a vertical direction on the screen.

The vertical direction may be a direction orthogonal to the bottom edge of the screen. The vertical direction may also be defined by projecting a gravity direction to the screen plane.

According to an embodiment, the visually perceivable relation indication is a computer-generated line segment connecting the computer-generated virtual object and the computer-generated indicator. For example, the line segment runs along a direction which is orthogonal to the bottom edge of the screen. According to another embodiment, the line segment may run along a direction which is defined by projecting a gravity direction to the screen plane.

According to an embodiment, when multiple computer-generated virtual objects related to respective ones of multiple points of interest are displayed on the screen, the computer-generated virtual objects are each placed at the bottom of the screen or are placed in a stacked manner one above the other.

According to an embodiment, the at least one point of interest is determined according to a location of the at least one point of interest in the real environment and a location of the camera in the real environment when capturing the image.

According to a further embodiment, the image position of the at least one point of interest in the image is determined based on an orientation of the camera relative to the at least one point of interest when capturing the image.

According to another embodiment, the at least one point of interest and/or the image position of the at least one point of interest is determined from analyzing the at least part of the image.

According to an embodiment, the method may further comprise the steps of determining a gravity angle as an angle between gravity direction and a normal direction of the screen, and if the determined gravity angle exceeds a predetermined threshold, displaying virtual visual information related to the at least one point of interest on the touchscreen, and any image captured by the camera is not displayed.

The examples disclosed above describe how to represent points of interest in a view of a real environment using a video-see-through device. For example, the video-see-through device comprises the screen and the camera. The real environment or the part of the real environment is captured as the image by the camera. The computer-generated virtual object, the computer-generated indicator and the at least part of the image are shown on the screen to the user.

As described above, the present invention could also be applied to representing points of interest in a view of a real environment using an optical-see-through device. For example, the optical-see-through device has a semi-transparent screen, such as a semi-transparent spectacle or glasses. A human eye is a capture device (equivalent to the camera) for capturing a view of the real environment or the part of the real environment. The view captured by the eye is equivalent to the image captured by the camera. The user then sees through the semi-transparent screen the real environment and the computer-generated virtual object and the computer-generated indicator blended in in the view on the screen.

BRIEF DESCRIPTION OF THE DRAWINGS

Aspects and embodiments of the invention will now be described with respect to the drawings, in which:

FIG. 1b shows another embodiment of the present invention when viewing an outdoor scene, FIG. 7a shows a depiction (left) according to which a mobile device, such as a mobile phone, is held at its vertical position, and a depiction (right) of an exemplary view displayed on the touchscreen of the mobile device, FIG. 7b shows a depiction (left) according to which a mobile device, such as a mobile phone, is held more naturally and tilted from its vertical position, and a depiction (right) of an exemplary view displayed on the touchscreen of the mobile device, FIG. 8 shows a flowchart of an embodiment of the invention presenting one or more POIs on a touchscreen of a mobile device, such as a mobile phone, equipped with a camera, FIG. 9 shows an embodiment of the invention for illustrating an exemplary triggering of an action performed by the mobile device when touching a displayed computer-generated virtual object, such as an annotation, FIG. 10a shows an example of state of the art for representing POIs in the view of a real environment on a semi-transparent screen of a head-mounted display, FIG. 10b shows an embodiment of the present invention for representing POIs in the view of a real environment on a semi-transparent screen of a head-mounted display.

In the following description, it is referred to the depictions of FIGS. 1 to 10b as it appears appropriate for describing aspects and embodiments of the present invention. All examples and embodiments described herein can equivalently be applied with an apparatus as shown in FIGS. 1-9 or an apparatus as shown in FIG. 10b. Accordingly, when referring to an image displayed to the user in the embodiments of FIGS. 1-9, this is to be replaced by view (which is captured by the user through the semi-transparent screen) when applied to an embodiment as shown in FIG. 10b.

DETAILED DESCRIPTION

The invention is most suitable to be used with a mobile device, which may be, for example, a hand-held device, such as a smartphone or a tablet computer.

Figure 1A:
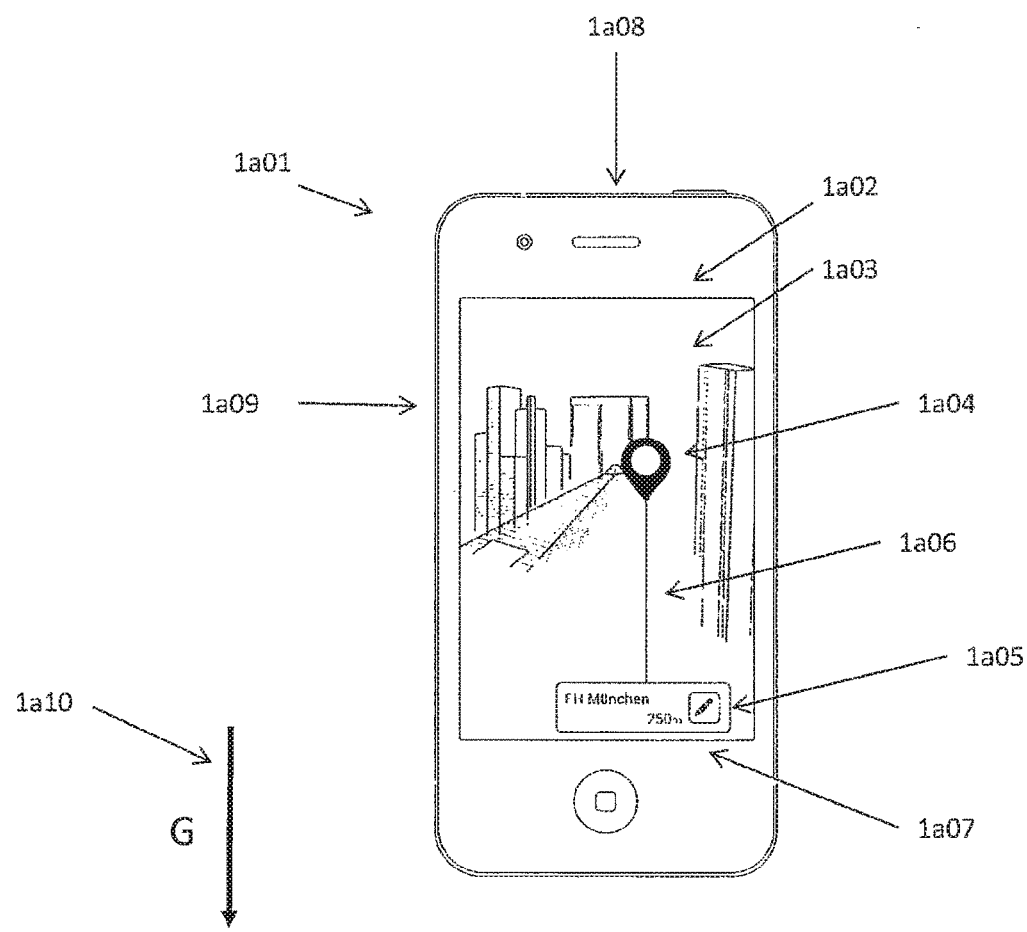
FIG. 1a shows an embodiment of the present invention when viewing an outdoor scene.

According a first embodiment, the mobile device, such as mobile device 1a01 of FIG. 1a, comprises, for the purposes of the invention, a camera which is adapted for capturing an image of a real environment or a part of a real environment. The camera is not explicitly shown in the Figures, but may be provided on the backside of the mobile device, such as known in the art for mobile phones, and indicated with reference number 1a08 in FIG. 1a and FIG. 7a designating a camera. The mobile device 1a01 further comprises a touchscreen 1a02 which is adapted for displaying at least part of the image on at least part of the touchscreen. The mobile device 1a01 also comprises a processing device, such as a microprocessor and associated circuitry which are commonly used in the art and not shown in the Figures, since they are internal to the mobile device. The internal processing device is indicated with reference number 1a09 in FIG. 1a.

Among other tasks as commonly used and applied in the art, with regard to the present invention the processing device 1a09 is configured to display images and points of interest in an image of a real environment when such view of the real environment is displayed on the touchscreen 1a02. The processing device 1a09 is further configured to perform tasks and steps as described herein in connection with the invention, such as the steps as described with reference to FIG. 8.

FIG. 1a and FIG. 1b show an embodiment of presenting one or more POIs on a screen of a mobile device, such as a mobile phone, equipped with a camera. The screen is a touchscreen and has a rectangular shape. The optical axis of the camera has a direction opposite and parallel or roughly parallel to a normal direction of the screen. As commonly known in the art, the normal direction of the screen is directed upwards when the screen is facing upwards. The present mobile phone is also equipped with a GPS sensor, a gravity sensor and a compass sensor.

FIG. 8 shows a flowchart of an embodiment of a method for displaying points of interest in a view of a real environment displayed on a touchscreen of a mobile device with a functionality for interaction with a user.

In a first step 8001, an image of a real environment is captured by the camera of the mobile device and at least part of the image is displayed on the touchscreen. A next step 8002 comprises obtaining the location of the mobile device in the real environment, e.g. from the GPS sensor. Step 8003 determines the heading direction of the mobile device in the real environment, e.g. according to data from the compass sensor (as described in more detail below). Step 8004 provides POIs with their locations in the real environment. The POIs may be stored on a remote server or the mobile device. Step 8005 selects relevant POIs from the provided POIs. Relevant POIs are POIs which may be relevant to be displayed in the view of the real environment. Step 8006 selects augmented POIs from the relevant POIs. Augmented POIs are POIs which are to be augmented with additional information, such as graphical object, name, etc. Step 8007 determines image positions of the relevant POIs in the image.

In step 8008 screen positions of computer-generated indicators (FIG. 1a: 1a04; here: circle) for relevant POIs on the touchscreen are determined according to the image positions of the relevant POIs. The computer-generated indicators are intended to indicate an associated POI in the area within or next to the indicator and may have, for this purpose, any suitable shape of a graphical element. For example, the POIs may be in (or behind) the center of the respective displayed circle 1a04 shown in the view of the real environment.

Step 8009 displays a computer-generated virtual object (FIG. 1a: 1a05; here: rectangle) for at least one augmented POI at a screen position adjacent to the bottom of the touchscreen. The computer-generated virtual object 1a05 is intended to provide a user interaction functionality as described in more detail below. As further described in more detail below, the screen position of the computer-generated virtual object 1a05 is determined according to the screen position of a corresponding computer-generated indicator 1a04. In step 8010, the computer-generated indicators 1a04 are overlaid to the at least part of the image on the touchscreen. Step 8011 displays a visually perceivable relation indication (FIG. 1a: 1a06; here: a line segment) connecting the computer-generated virtual object 1a05 and the corresponding computer-generated indicator 1a04 on the touchscreen. In this way, it is indicated to the user that with pressing or touching the computer-generated virtual object 1a05 an action may be performed by the mobile device related to the corresponding point of interest. A user may touch at least part of the computer-generated virtual object 1a05 on the touchscreen to trigger an action of the mobile device (step 8012), such as described in an example with respect to FIG. 9.

The computer-generated virtual object 1a05 displayed on the touchscreen is preferred to be displayed on a screen position adjacent to a bottom edge of the screen (see screen border 1a07 which is a bottom edge of screen 1a02 in FIG. 1a). A screen position of the computer-generated virtual object 1a05 is determined according to the screen position of the computer-generated indicator 1a04. For example, if the screen position of the computer-generated indicator 1a04 moves to the left according to a movement of the mobile device and the displayed view, the computer-generated virtual object 1a05 is also shifted to the left accordingly. This may be done in a way that, e.g., the computer-generated virtual object 1a05 is displayed vertically below the computer-generated indicator 1a04, as described herein, also in a case where the computer-generated indicator 1a04 moves.

To determine a bottom edge or bottom of the screen, lower edges of the screen can be determined at first. An edge of the screen is determined to be a lower edge of the screen, if at least part of the edge has the shortest distance to the ground plane among the edges of the screen. In such case, a lower edge of the screen is determined to be a bottom edge or bottom of the screen, if the angle of the lower edge with respect to the gravity direction is the smallest angle among the angles of all the lower edges with respect to the gravity direction.

Figure 3:
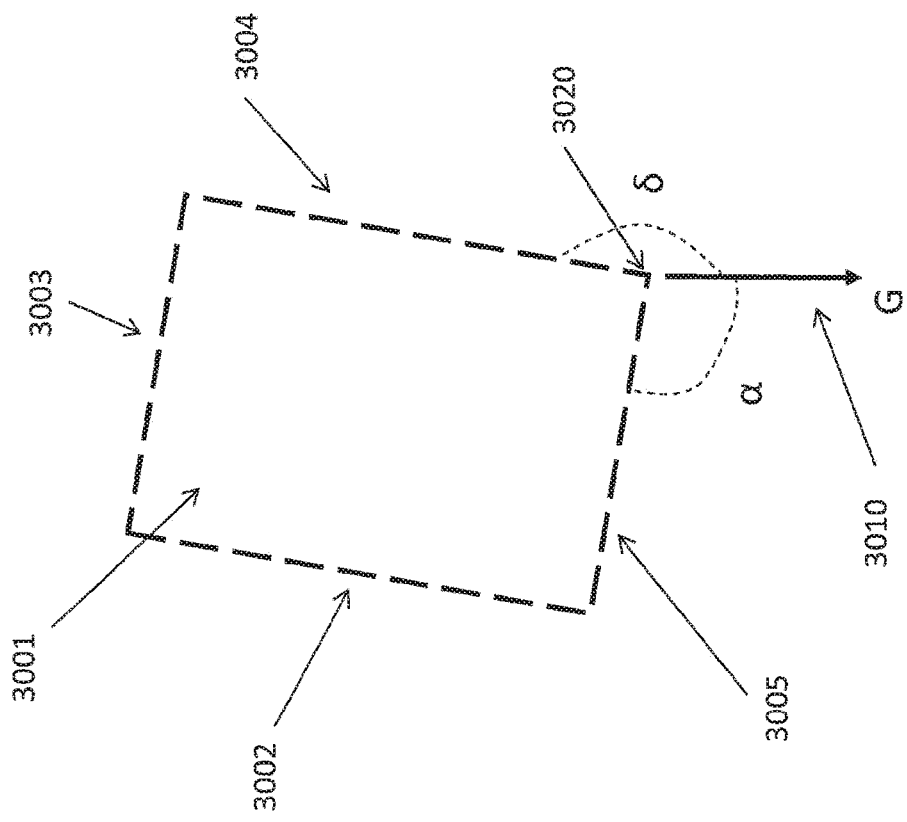
FIG. 3 shows a visualization for an exemplary determination of a bottom edge of a display device, such as a touchscreen, having the shape of a rectangle.

According to FIG. 3, an exemplary screen 3001 has a rectangular shape and has four edges 3002, 3003, 3004, and 3005. Reference number 3010 shows a gravity direction G with respect to screen 3001 in FIG. 3. Both edges 3004 and 3005 have a part (here: corner 3020) that has the shortest distance to the ground plane among the edges of screen 3001. The angle of edge 3005 with respect to gravity direction 3010 is angle α and the angle of edge 3004 with respect to gravity direction 3010 is angle δ. In this example, angle α is smaller than angle δ, and thus edge 3005 is determined to be the bottom edge of screen 3001.

If there are more than one edge candidates which satisfy the criteria of the bottom edge, an edge candidate that is the bottom edge in the last previous screen position may be determined to be the bottom edge. If none of the edge candidates is the bottom edge in the last previous screen position, any edge candidate may be chosen as the bottom edge. If the screen plane is orthogonal to the gravity direction, the bottom edge of the screen is indefinite and there is no bottom edge.

According to an embodiment, the computer-generated virtual object (such as 1*a*05) is displayed at a screen position such that a line segment (such as 1*a*06) passing the computer-generated indicator (such as 1*a*04) along the vertical direction intersects with the computer-generated virtual object on the screen.

The computer-generated virtual object and the computer-generated indicator are related by a visually perceivable relation indication on the screen. For example, a (e.g., dash or solid) line, such as line segments 1*a*06, 1*b*06 in FIGS. 1*a*, *b* and 2006 in FIG. 2, may be drawn to pass the respective computer-generated virtual object and the computer-generated indicator on the screen.

It is possible to trigger an action performed by the mobile device by touching the computer-generated virtual object (such as 1*a*05, 1*b*05, 2005) on the screen. This may be realized, for example, by a finger touching the touchscreen in the respective region of display. The triggered action may display a web page, a video, and/or any detailed information about the related at least one point of interest on the screen. The action may also generate some sound, e.g. music.

The normal direction of the touchscreen is defined as a direction perpendicular to the screen plane and toward the front of the screen. The gravity direction is defined as a direction along gravity and toward earth. A gravity angle of the screen is an angle between the gravity direction and the normal direction of the screen. When the screen is vertically held, the gravity angle is about 90 degrees for example. When the screen is horizontally held, the gravity angle is about 180 degrees for example.

The gravity angle may be determined by a gravity sensor associated with the mobile device. The gravity angle may also be determined by using the camera to capture a real object having a known orientation with respect to gravity.

Figure 4:
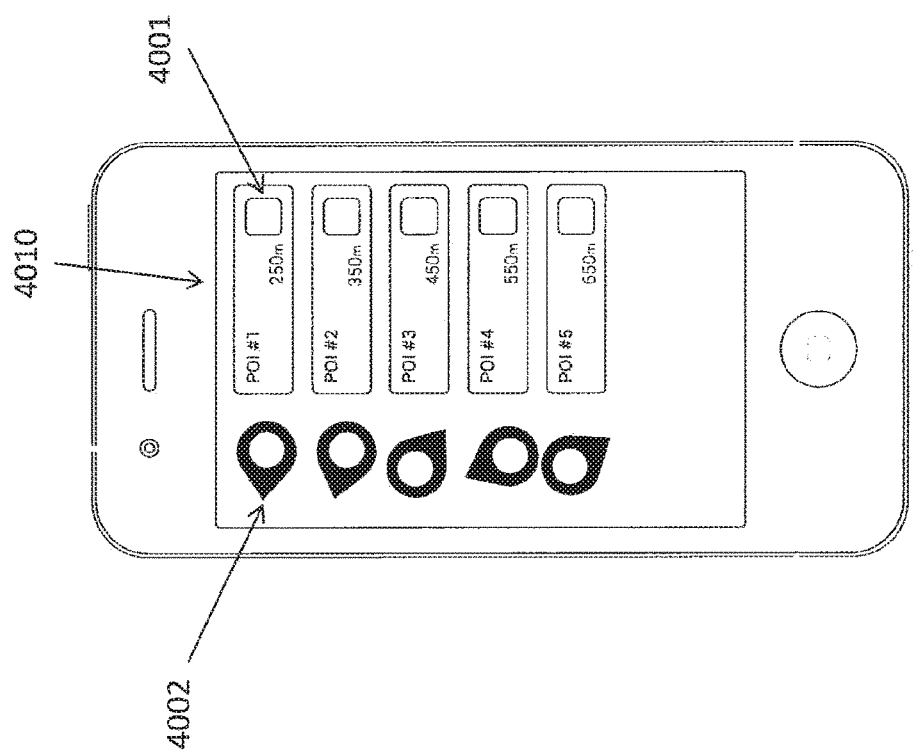
FIG. 4 shows an embodiment of the present invention when a screen of a mobile device is placed such that the normal of the screen is parallel to gravity direction.
Figure 5:
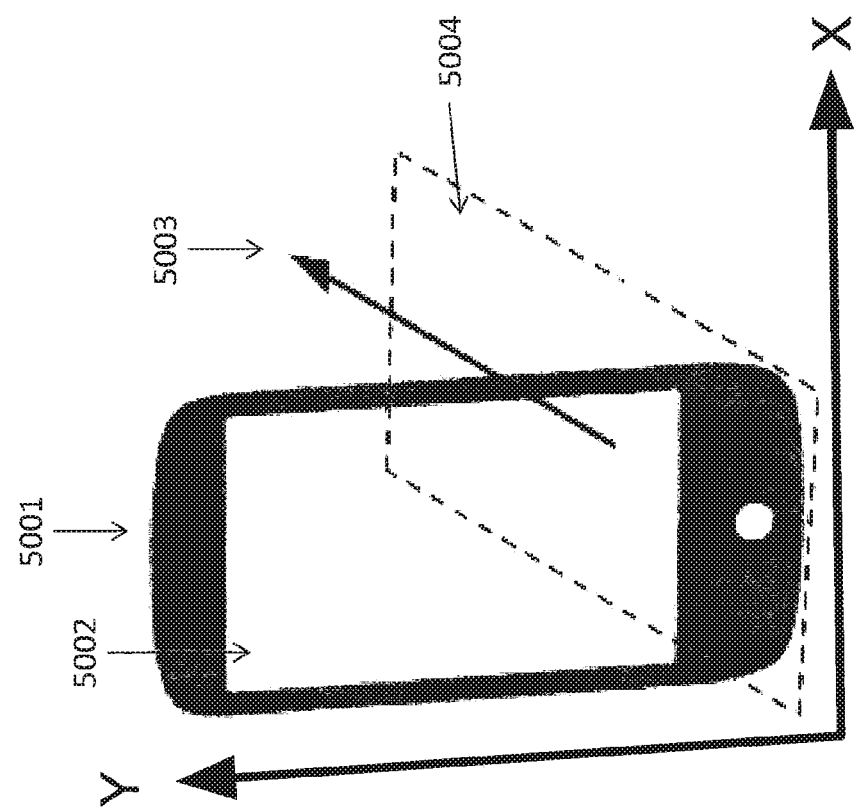
FIG. 5 shows a visualization for an exemplary determination of a heading direction of a device.
Figure 6:
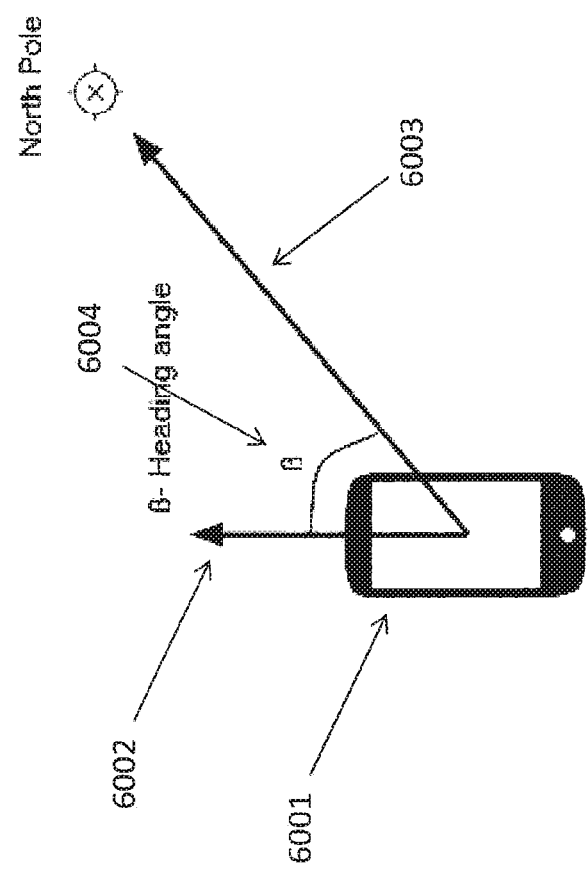
FIG. 6 shows a visualization for an exemplary determination of a heading angle of a device.

If the gravity angle exceeds a pre-determined threshold, a virtual visual information related to the at least one point of interest may be displayed on the screen, and any image captured by the camera is not displayed. In this regard, FIG. 4 shows an embodiment where computer-generated virtual objects (e.g. 4001) and computer-generated indicators (e.g. 4002), such as direction indicators, related to the computer-generated virtual objects are displayed on screen 4010. The virtual visual information includes the computer-generated virtual object 4001 or similar and may further include an information indicating a direction from the mobile device to the at least one point of interest, as shown in FIG. 4 by the respective direction indicator. The direction may be computed based on a compass device equipped to the mobile device or based on an image captured by the camera.

According to an embodiment, POIs are stored on a server that is remote and separate from the mobile device. The mobile device may communicate with the server through a wireless network. The server further stores information associated with the POIs, such as locations, names, descriptions, images and supplemental information. The locations of the POIs may have 2D coordinates with latitude and longitude, which determine their respective positions on the surface of the earth, i.e. positions relative to a real environment. It is reasonable to use latitude and longitude, as most real objects represented by the POIs are standing on the surface of the earth. However, it is also possible to use 3D coordinates with longitude, latitude and altitude for the present invention. This is particularly useful for representing POIs located above the ground, e.g. on a mountain.

However, it should be noticed that all the information regarding the POIs mentioned above may also be stored on the mobile device. In this case, it is not necessary for the mobile device to communicate with the server and obtain the POIs and related information from the server.

An image of the real environment or a part of the real environment is captured by the camera. For example, a geo-location of the mobile device is obtained from an associated GPS sensor. The geo-location may be used as the camera position of the image (i.e. the position of the camera when capturing the image) in the real environment. It is reasonable to use latitude and longitude coordinates, when the mobile device is positioned by a user standing on the surface of the earth.

A heading direction of the mobile device defines a direction within the ground plane and may be read from the compass sensor. For example, with reference to FIG. 5, the heading direction 5003 of the mobile device 5001 may be determined by projecting the opposite direction of the normal direction of the screen 5002 onto the ground plane 5004 along a plane defined by the normal direction and Y axis of the screen. A heading angle of the mobile device may be defined to be an angle between the heading direction and a direction from the mobile device to a frame of reference, such as the north. For example, according to FIG. 6 the heading angle β 6004 of the mobile device 6001 is an angle between heading direction 6002 and direction 6003 to north.

According to an embodiment, POIs relevant to the image displayed on the touchscreen of the mobile device are selected from the POIs, such as stored on the server (see step 8005 of FIG. 8). For this, the mobile device may send its geo-location to the server. The sever computes distances of the POIs or a part of the POIs to the mobile device. A direction of a POI is determined by a direction pointing from the geo-location of the mobile device to the location of the respective POI. A direction angle of a POI is an angle of a direction of the POI with respect to a frame of reference, such as the north.

For example, POIs are selected as relevant POIs from a plurality of POIs based on their distances (in the real world) to the mobile device and/or angle differences between the heading angle of the mobile device and their direction angles. For example, only POIs whose distances to the mobile device are below a certain threshold are selected. Balloons or circles 1*b*08 and 1*b*04 indicate selected relevant POIs (see FIG. 1*b*). According to an embodiment, the relevant POIs will be represented by computer-generated indicators on the screen.

For selecting relevant POIs, it is also possible to send the POIs or part of the POIs and the associated information from the server to the mobile device, and perform any selection operations on the mobile device.

In the further process, image positions of the relevant POIs in the image are calculated (see step 8007 of FIG. 8). In one embodiment, the image positions could be obtained from intersections between the image plane of the camera and a line from the POIs to the camera. Then, according to an embodiment, computer-generated indicators, e.g. balloons or circles 1*b*04 and 1*b*08, are overlaid with the image at the image positions of the relevant POIs on the screen (see FIG. 1*b*). The computer-generated indicators could be 2D or 3D models.

In order to avoid overloaded visual information on the screen, it is preferred to display additional information for a limited number of the relevant POIs if there are a large number of the relevant POIs.

Further, one or more POIs are determined as augmented POIs among the relevant POIs (see step 8006) and computer-generated virtual objects respectively related to the augmented POIs are displayed on the screen (see step 8009). For example, augmented POIs may be selected if they have the smallest angles between their directions to the mobile device and the heading direction of the mobile device among the relevant POIs. The angle could be computed based on the heading angle of the mobile device and direction angles of the relevant POIs. In FIG. 1*b*, balloons or circles **1*b*04** indicate such augmented POIs.

Further, the computer-generated virtual objects for the augmented POIs are generated and displayed. An augmented POI may have one or more computer-generated virtual objects. In one example shown in FIG. 1*b*, the computer-generated virtual objects are annotations **1*b*05 that include names of the augmented POIs 1*b*04** and distances between the mobile device and the augmented POIs in real world. The computer-generated virtual objects could also contain imagery information about POI.

In the present embodiment, each annotation is represented with a rectangular box. For a screen size between about 10 and 15 cm (diagonal), a maximum number of augmented POIs is preferred to be three with motivation to reduce augmented reality (AR) scene clutter and focus user attention to the AR experience itself. Therefore, with the computer-generated virtual objects additional information for POIs is provided, e.g. via annotations, in non-obstructive fashion.

The annotations, i.e. generally the computer-generated virtual objects, should preferably be placed at positions on the touchscreen such that the annotations will not introduce any occlusion on imagery information on the screen. Modern touchscreens allow users to touch the annotation on the screen in order to trigger one or more actions related to the respective POI. Thus, the placement of the annotations should further enable them to be easily reached by user's fingers when a user holds the mobile device.

The prior art as referred to herein suggests placing annotations at image positions of the POIs on the screen. The image positions of the POIs depend on the respective camera pose relative to the POIs. This means that the image positions of the POIs depend on the orientation of the mobile device held by a user. In most cases, the POIs and the mobile device are standing on the surface of the earth. Thus, when the mobile device is held vertically, i.e. the normal **7*a*02 of the screen of the mobile device 7*a*01 is perpendicular to the gravity direction 7010**, the image positions of the POIs are typically at a horizontal line roughly in the middle of the image (see right depiction of FIG. 7*a*). In this example, the balloons **7*a*05 (having annotations 7*a*06) are displayed around a horizontal line roughly in the middle of the screen of the mobile device 7*a*01**.

On the other hand, according to an embodiment of the invention, when the mobile device is held more naturally and tilted from its vertical position, i.e. at an obtuse angle between the normal **7*b*02 of the screen of the mobile device 7*b*01 and the gravity direction 7010**, the image positions of the POIs are at a horizontal line above the middle of the image (see right depiction of FIG. 7*b*). In this example, the balloons (generally the indicators) **7*b*05 are displayed in an upper area of the screen of the mobile device 7*b*01, while the annotations 7*b*06 (generally the virtual objects) are still shown at the bottom of the screen. From this example, the improvement in comfortable user interaction and information visibility achieved by the invention is clearly evident, since the annotations 7*b*06** to trigger an interaction with the mobile device can still be touched comfortably by the thumb of the user's hand.

Users typically prefer to hold mobile devices tilted rather than vertically in most cases. Holding the device tilted introduces problems for a user to touch the annotations of the POIs displayed in the middle or upper areas on the screen. For example, when a hand holds the mobile device and the thumb of the hand touches the POIs, the thumb may occlude imagery information displayed on the screen. Further, as disclosed in references [1,2,7], for mobile hand-held devices, such as phones and tablets, upper areas of their screens are uncomfortable to be reached by the thumb.

An improvement according to the present invention, as described above, results from placing an indicator at or close to the image position of a POI to indicate the POI on the display, and placing a related computer-generated virtual object for POI related user interaction, such as an annotation, below the POI, e.g. at the bottom of the screen, apart from the image position of the POI. This optimizes visibility and accessibility of the POI and its associated functions. It is particularly beneficial for cases of users using one hand to hold the mobile device and the thumb of the same hand to touch the computer-generated virtual object related to the POI on the screen for any user interaction. Usually, the bottom area of the screen is a comfortably or easily accessible area, as disclosed in references [1,2,7], and further the thumb will not occlude major imagery information when it touches the bottom area.

As shown in the embodiments of the Figures, the annotations are displayed lower than the respective displayed computer-generated indicator for the POIs on the screen. Particularly, the annotations are preferred to be displayed adjacent to the bottom of the screen. It might be that the annotations displayed on the screen may not directly contact the bottom of the screen, but have a small gap from the bottom of the screen. The area of the small gap may be defined according to the display area of the screen. For example, the height of the small gap (i.e. a distance between the bottom of the screen and a lower border of an annotation) is defined as being smaller than about ⅒ of the height between the bottom of the screen and the top of the screen.

Furthermore, when there are more than one annotation to be displayed, the annotations may each be placed on the bottom of the screen, or placed in a stack mode, i.e. one annotation being placed on the top of another annotation (see FIGS. 7*a* and 7*b*). The screen positions of the annotations are further determined according to the screen positions of the indicators of the corresponding POIs.

According to an embodiment, an annotation is displayed at a screen position such that a line passing the corresponding indicator along a direction orthogonal to the bottom edge of the screen intersects with the annotation on the screen.

In order to enable the user to visually perceive relationships between the displayed annotations and the augmented POIs, a line segment may be drawn on the screen to connect an annotation and an indicator related to the same augmented POI.

The user may touch an annotation or a part of an annotation displayed on the screen in order to trigger an action, e.g. displaying a web page, a video, or a complete description about the corresponding POI related to the touched annotation. FIG. 9 shows an embodiment of triggering an action by touching an annotation. Reference number 9001 shows an AR view of annotations and indicators overlaid with an image of a real environment according to an embodiment of the present invention. 9004 indicates the touch-point on the annotation 9005 of POI "Marienplatz", which is associated with indicator 9006, touched by a thumb of a user. This touching triggers an action that displays a description 9007 of POI "Marienplatz" on the top of the screen as shown in view 9002. The user could further touch the screen at the touch-point 9008. Then, this touching may further trigger an action to display a route to the physical location of POI "Marienplatz", shown here as dashed curve 9009 overlaid with a camera image in the view 9003. The dashed curve ends at the location of the POI.

As the augmented POIs, according to an embodiment, are selected based on the heading direction of the mobile device, the user may rotate the mobile device to different heading directions in order to choose POIs to have their annotations displayed on the bottom of the screen. For example, referring to FIG. 1b, the mobile device may be rotated to the left, so that annotations for three indicators (left) 1b08 are shown, and the presently displayed annotations 1b05 for indicators 1b04 disappear. Therefore, no additional (touch) user input is required to select POIs around the user in a current context.

If the screen, e.g. the mobile device, is only tilted without changing its heading direction, the image positions of the indicators will change accordingly, while the displayed annotations will stay at substantially the same positions on the screen (see FIGS. 7a and 7b). This improves the usability of overlaying POI information with images of a real environment displayed on a screen of a mobile device held by a user. This accounts for the fact that a comfortable way of holding a mobile device by one hand or two hands is typically in most cases a tilted holding, in contrast to a vertical holding.

When the mobile device is moved to another heading direction and capturing a second image, the image positions of the indicators in the second image will change accordingly and the annotations will also move on the screen according to changes between the image positions of the indicators in the original (first) image and the second image. Furthermore, according to an embodiment, a radar view may be displayed on the screen. The relevant POIs or some of them and the mobile device may be displayed in the radar view according to their locations and orientations in the real environment.

The gravity angle of the screen, which is an angle between the gravity direction and the normal direction of the screen, may be determined by a gravity sensor associated with the mobile device. For example, if the gravity angle of the screen exceeds a pre-determined threshold, information related to relevant POIs or part of them is displayed on the screen, while any image captured by the camera is not displayed. The relevant POIs are determined among the POIs stored on the server based on relative locations and directions between the POIs and the mobile device.

The information of a POI could be a rectangular box (e.g. 4001) including imagery, or textual information or similar and may further include direction information from the mobile device to the POIs. The direction could be computed based on a compass device which is part of the mobile device. When the screen is horizontally placed, a list of rectangular boxes representing POIs is displayed on the screen as shown in FIG. 4, i.e. one box placed on top of another box. Each box (e.g. 4001) may have a direction indicator (e.g. 4002) that indicates the direction to the real location of the POI represented by the box.

In the example above, real objects represented by POIs do not need to be visible in a camera image. Image positions of the POIs could be computed based on known locations of the POIs and the pose of the camera in a common coordinate system, e.g. a global coordinate system.

For overlaying information about a path to a POI in the image, a user can choose an option to show a virtual path that would be leading to a physical location of the selected POI. A virtual path may be drawn as a curved line overlaid on a camera-image in respective frames. A line starts at the current user location and ends at the location of the POI.

In another example, image positions of POIs may be determined by analyzing image features in a camera image. This requires that real objects represented by the POIs are visible in the camera image. Any known image template matching methods may be employed for detecting real objects in the image with one or more image templates of the real objects.

Figure 2:
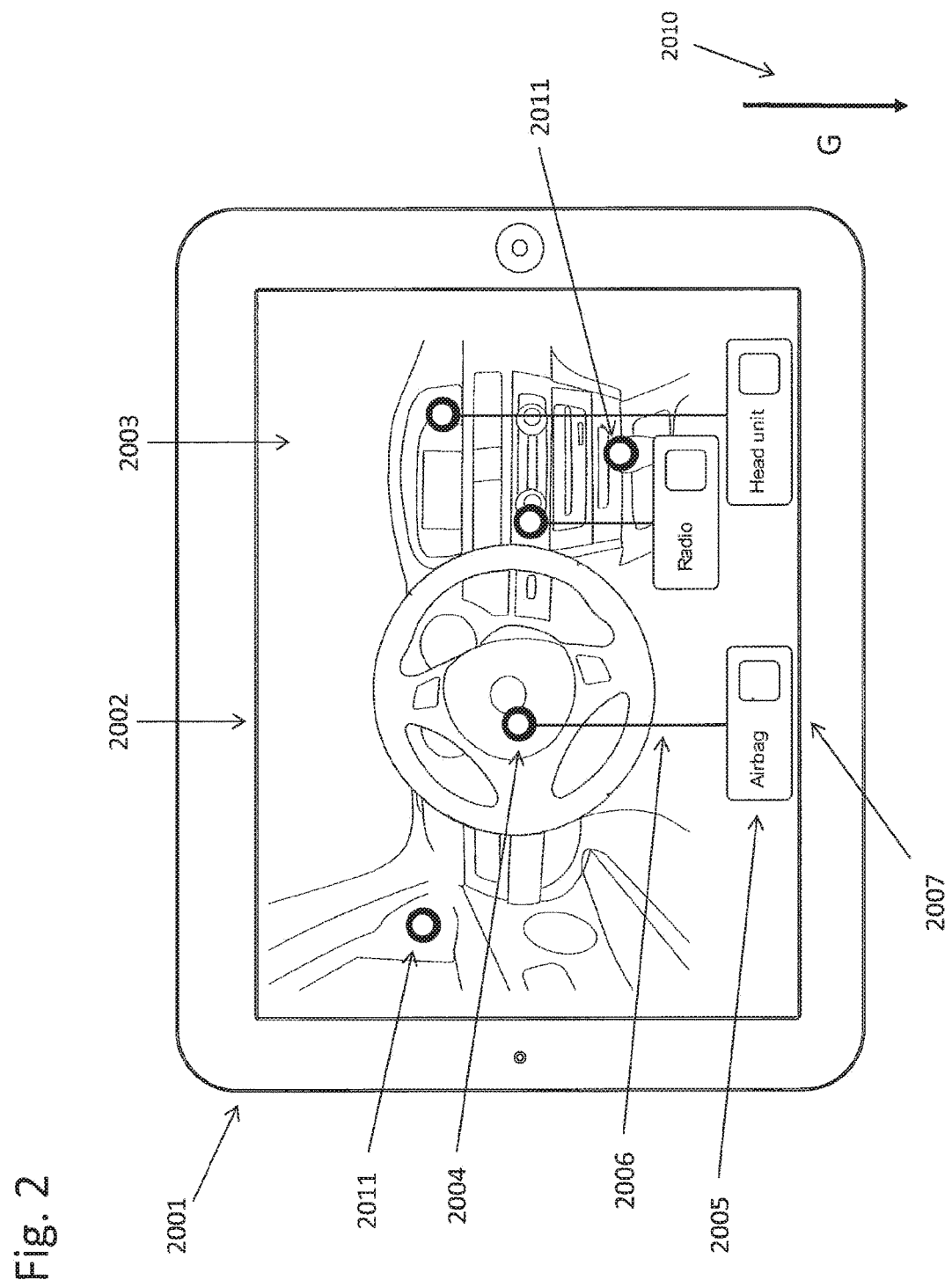
FIG. 2 shows an embodiment of the present invention when viewing an internal real environment of a vehicle.

According to a further embodiment of the invention, FIG. 2 shows computer-generated virtual objects (here: annotations) overlaid with an image of a control panel of a car on a screen of the mobile device. The image is captured by a camera of the mobile device. Several objects of the control panel may be detected in the image based on visual template matching by comparing at least part of the image and visual templates. For example, the visual templates are stored on a server that sends the templates to the mobile device via wireless connection. The visual templates could also be stored on the mobile device. In the context of the invention, some of the objects on the control panel are points of interest.

For example, a computer-generated indicator (here: circle) 2004 is placed at the respective image position to indicate a location of a POI in the image. The computer-generated virtual object (here: annotation) 2005 showing the POI name is displayed below and connected with line 2006 to the circle. In this example, not each of the POIs is augmented by an annotation, so that, e.g., circles 2011 do not have associated and displayed annotations. Determining augmented POIs among the POIs displayed in the image could be based on their image positions or manually. For example, POIs with image positions near to or at the middle of the image may be chosen as augmented POIs.

The disclosed method could also be applied to representing points of interest in a view of a real environment using a mobile device such as an optical-see-through device. For example, the optical-see-through device comprises a head-mounted display comprising a semi-transparent screen. The human eye is a capture device (equivalent to the camera) for capturing a view of the real environment or the part of the real environment. The view captured by the eye is equivalent to the image captured by the camera, as described above. The user then sees through the semi-transparent screen the real environment and the computer-generated virtual object and the computer-generated indicator blended in in the view on the semi-transparent screen.

The head-mounted display may be further equipped with a location sensor (such as GPS) and an orientation sensor (such as compass sensor). The location sensor could determine a position of a viewing point of the view relative to the real environment. The orientation sensor could determine a view orientation of the view relative to the real environment. A location of at least one point of interest relative to the real environment may be provided.

The position of the at least one point of interest relative to the view can be determined according to the position of the viewing point, the view orientation and the location of the at least one point of interest.

According to an embodiment, the head-mounted display may be equipped with a camera. The position of the at least one point of interest relative to the view could also be determined according to one or more images of at least part of the real environment captured by the camera.

A computer-generated indicator (e.g. a balloon) could be blended in in at least part of the view on the semi-transparent screen at a screen position according to the position of the at least one point of interest relative to the view.

A computer-generated virtual object (e.g. an annotation) related to the at least one point of interest is blended in on the semi-transparent screen at a screen position determined according to the screen position of the computer-generated indicator and which is adjacent to a bottom edge of the semi-transparent screen.

For example, a line segment between the computer-generated virtual object and the computer-generated indicator is blended in on the semi-transparent screen.

The head-mounted display performs an action related to the at least one point of interest if at least part of the computer-generated virtual object blended in on the semi-transparent screen is overlapped by a user's finger or device held by the user. This requires to detect a position of the user's finger or device held by the user relative to the semi-transparent screen, i.e. determining a screen position of the user's finger or device held by the user on the semi-transparent screen.

In one embodiment, a position sensor may be attached to the user's finger or device held by the user in order to determine the screen position of the user's finger or device held by the user. The position sensor could be such as, but not limited to, a GPS and an accelerometer.

In In another embodiment, the camera of the head-mounted display can be used to detect the user's finger or device held by the user. An image position of the user's finger or device held by the user can be detected based on the image. The camera may have a known position relative to the semi-transparent screen. Thus, a screen position of the user's finger or device held by the user on the semi-transparent screen may be determined according to its image position in the image.

In FIGS. 10a and 10b show a user 10a04 who sees through the semi-transparent screen 10a02 of the head-mounted display 10a03 a view 10a01 of a real environment and balloons 10a11, 10a12 or 10a13 and annotations 10a21, 10a22 or 10a23 related to POIs blended in in the view 1001 on the semi-transparent screen 10a02.

In FIG. 10a shows an example of state of the art for representing three POIs in the view 10a01 of a real environment on the semi-transparent screen 10a02 of the head-mounted display 10a03. The head-mounted display 10a03 is worn by the user 10a04. In this embodiment, the three POIs have associated indicators (i.e. balloon) 10a11, 10a12 or 10a13 and annotations 10a21, 10a22 or 10a23. For each of the three POIs, the corresponding balloon and annotation are blended in at the same position in the view.

In The user 10a04 has to move his hand 10a06 up such that the user's finger could overlap with the annotation 10a23 blended in in the view on semi-transparent screen 10a02 in order to interact with the corresponding POI, such as triggering a program related to the corresponding POI running on the head-mounted display 10a03. One problem is that the user's hand 10a06 occludes a certain part of the view. Further, it is uncomfortable for the user to move his hand too high.

In FIG. 10b shows an embodiment of the present invention for representing the three POIs in the view 10a01 of the real environment on the semi-transparent screen 10a02 of the head-mounted display 10a03. Analogous to the other embodiment related to a touchscreen of a mobile device described above, the head-mounted display 10a03 also comprises a processing device, such as a microprocessor and associated circuitry which are commonly used in the art and not shown in the Figures, since they are internal to the device. The internal processing device is indicated with reference number 10a09 in FIG. 10b.

Among other tasks as commonly used and applied in the art, with regard to the present invention the processing device 10a09 is configured to display the points of interest on the semi-transparent screen 10a02 of the head-mounted display 10a03, i.e. points of interest in the view of the real environment provided on the semi-transparent screen. The processing device 10a09 is further configured to perform tasks and steps as described herein in connection with the invention, such as the steps as described or analogous with reference to FIG. 8.

The POIs have their corresponding annotations 10a21, 10a22 and 10a23 blended in on the semi-transparent screen and the annotation 10a23 is adjacent to the bottom edge 10a05 of the screen while corresponding indicators (balloons) 10a11, 10a12 and 10a13 are blended in on the semi-transparent screen at the positions of the POIs. The balloons and the annotations are connected by lines blended in on the semi-transparent screen. The user 10a04 could move his hand 10a06 such that the user's finger could overlap with the annotation 10a23 blended in in the view in order to interact with the corresponding POI without occluding the view 10a01. This movement is different from the movement as shown in FIG. 10a and more advantageous, since it is sufficient for the user to keep his hand lower in the view for interacting with the corresponding POI, thus resulting in not occluding the view. Further, it is more comfortable for the user to move his hand more naturally, particularly not as high as in FIG. 10a.

The invention claimed is:

1. A method for representing points of interest in an image of a real environment, comprising:
  displaying, by a display element, an image of a real environment;
  determining at least one point of interest in the image;
  determining a position of the at least one point of interest within the image;
  displaying, by the display element, a computer-generated indicator associated with the at least one point of interest on the image, a location of the computer-generated indicator based on the position of the at least one point of interest;
  displaying, by the display element, a computer-generated virtual object related to the at least one point of interest at a location based on the location of the computer-generated indicator;
  displaying a visually perceivable relation indication indicative of a relation between the computer-generated virtual object and the computer-generated indicator;
  determining a change in position of the at least one point of interest within a second image of the real environment;

updating, on the display element, display of the computer-generated indicator based on the change in position of the at least one point of interest; and updating, on the display element, display of the visually perceivable relation indication based on the updated location of the computer-generated indicator.

2. The method of claim 1, further comprising:

receiving input via the computer-generated virtual object; and in response to receiving the input, performing an action related to the at least one point of interest associated with the computer-generated virtual object.

3. The method of claim 1, wherein the display element is a semi-transparent display element.

4. The method of claim 3, wherein the computer-generated virtual object is displayed adjacent to a bottom edge of the semi-transparent display element.

5. The method of claim 1, wherein the display element is part of a mobile device.

6. The method of claim 5, wherein the position of the at least one point of interest in the image is determined based on an orientation of the mobile device relative to the at least one point of interest.

7. A non-transitory computer readable medium for representing points of interest in an image of a real environment, comprising computer readable code executable by one or more processors to:

display, by a display element, an image of a real environment;

determine at least one point of interest in the image;

determine a position of the at least one point of interest within the image;

display, by the display element, a computer-generated indicator associated with the at least one point of interest on the image, a location of the computer-generated indicator based on the position of the at least one point of interest;

display, by the display element, a computer-generated virtual object related to the at least one point of interest at a location based on the location of the computer-generated indicator;

display, by the display element, a visually perceivable relation indication indicative of a relation between the computer-generated virtual object and the computer-generated indicator;

determine a change in position of the at least on point of interest within a second image of the real environment update, on the display element, display of the computer-generated indicator based on the change in position of the at least on point of interest; and update, on the display element, display of the visually perceivable relation indication based on the updated location of the computer-generated indicator.

8. The non-transitory computer readable medium of claim 7, further comprising computer readable code to:

receive input via the computer-generated virtual object; and in response to receiving the input, perform an action related to the at least one point of interest associated with the computer-generated virtual object.

9. The non-transitory computer readable medium of claim 7, wherein the display element, is a semi-transparent display.

10. The non-transitory computer readable medium of claim 9, wherein the computer-generated virtual object is displayed adjacent to a bottom edge of the semi-transparent display.

11. The non-transitory computer readable medium of claim 7, wherein the display element is part of a mobile device, and wherein the position of the at least one point of interest in the image is determined based on an orientation of the mobile device relative to the at least one point of interest.

12. A system for representing points of interest in a view of a real environment, comprising:

a display element;

one or more processors; and a memory coupled to the one or more processors and comprising computer readable code executable by the one or more processors to:

display, by the display element, an image of a real environment;

determine at least one point of interest in the image;

determine a position of the at least one point of interest within the image;

display, by the display element, a computer-generated indicator associated with the at least one point of interest on the image a location of the computer-generated indicator based on the position of the at least one point of interest;

display, by the display element, a computer-generated virtual object related to the at least one point of interest at a location based on the location of the computer-generated indicator;

display, by the display element, a visually perceivable relation indication indicative of a relation between the computer-generated virtual object and the computer-generated indicator;

determine a change in position of the at least one point of interest within a second image of the real environment;

update, on the display element, display of the computer-generated indicator based on the change in position of the at least one point of interest; and update, on the display element, display of the visually perceivable relation indication based on the updated location of the computer-generated indicator.

13. The system of claim 12, further comprising computer readable code to:

receive input via the computer-generated virtual object; and in response to receiving the input, perform an action related to the at least one point of interest associated with the computer-generated virtual object.

14. The system of claim 12, wherein the display element is a semi-transparent display.

15. The system of claim 14, wherein the computer-generated virtual object is displayed adjacent to a bottom edge of the semi-transparent display.

16. The system of claim 12, wherein the display element is part of a mobile device.

17. The system of claim 16, wherein the position of the at least one point of interest in the image is determined based on an orientation of the mobile device relative to the at least one point of interest.

* * * * *